United States Patent [19]

Crossman

[11] 4,192,407
[45] Mar. 11, 1980

[54] BRAKE ADJUSTER WITH INTERNAL SWAGE

[75] Inventor: Richard L. Crossman, Tallmadge, Ohio

[73] Assignee: Goodyear Aerospace Corporation, Akron, Ohio

[21] Appl. No.: 933,338

[22] Filed: Aug. 14, 1978

[51] Int. Cl.² .............................................. F16D 65/54
[52] U.S. Cl. ................................. 188/196 R; 188/71.8
[58] Field of Search .................. 188/1 C, 71.8, 196 P, 188/196 R; 192/111 A

[56] References Cited

U.S. PATENT DOCUMENTS

| 3,026,972 | 3/1962 | Hendry et al. | 188/1 C |
| 3,903,999 | 9/1975 | Ditlinger | 188/196 R |

Primary Examiner—Duane A. Reger
Attorney, Agent, or Firm—P. E. Milliken; R. L. Weber; E. W. Oldham

[57] ABSTRACT

An adjuster for brake wear compensation. Fundamentally, the invention includes a casing affixed to a brake housing. Maintained within the casing, and operative between the ends thereof, is a spring follower. A hollow tubular member is received within the spring follower and in contacting engagement with one end thereof. A shaft passes through the tubular member and is connected at a first end to the brake system pressure plate and is characterized at the other end by a swage. The swage is of a perimeter substantially equivalent to the inside circumference of the tubular member. However, the swage and tubular member are of different geometrical configurations. As brake wear compensation is made, the pressure plate draws the swage through the tubular member and reshapes the same without stretching or enlarging the tubular member itself.

16 Claims, 3 Drawing Figures

BRAKE ADJUSTER WITH INTERNAL SWAGE

BACKGROUND OF THE INVENTION

The instant invention deals in the art of braking systems and more particularly with braking systems for aircraft. Heretofore, it has been known to utilize a plurality of brake disks, alternately splined to the axels and hubs of aircraft wheels, to effectuate a braking effort on the wheels. While brake disks have been quite satisfactory for their heat dissipating characteristics, it has been found that the same wear and, hence, adjustments need to be made such that brake pedal travel and force are substantially consistent with braking effort irrespective of the wear experienced by the brake disk stack. Adjustment is also required such that a maximum amount of usage may be obtained from the brake disks.

Numerous approaches have been taken in the art to achieve the desired brake adjustment. It has been known to use different standard types of adjusters wherein brake adjustment is achieved by a frictionally slidable unit on a tube. Using the standard brake adjuster mechanism, it has been found that a wide variance of loads exist for any given distance of brake travel or brake application. In other words, the force versus displacement curves of the present standard types of adjusters do not trace each other on successive brake applications and as the brake disks wear. The force necessary to overcome the frictional engagement varies with each brake application.

Another shortcoming in utilizing the standard brake adjusters of the prior art is that design considerations must be given to the difference between static and dynamic coefficients of friction. When brake pressure is first applied, the first amount of travel experienced by the return mechanism is that known in the art as the "built-in clearance." The next portion of travel is that compensating for brake wear experienced during prior braking efforts. Above this, the force applied is that known as the effective brake force. However, with the static coefficient of friction being greater than the dynamic coefficient of friction, the force applied to effectuate movement of the standard adjuster to compensate for brake wear must be sufficient to overcome both coefficients of friction and the return spring brake on force. Should the standard unit slip, the spring follower may then return to a point where there is no longer a "built-in clearance." The brakes will then either stay in a locked position or, at best, there will be a loss of built-in clearance for subsequent brake applications.

Numerous approaches have been taken to circumvent the problems inherent with the present standard types of adjusters. Teachings of such approaches may be found in U.S. Pat. Nos. 3,376,959; 3,958,670; and 3,990,547. Applicant's own U.S. Pat. No., 3,926,283, shows yet another approach. While these patents teach an advancement over the standard apparatus, they themselves have certain drawbacks inherent therewith. For instance, applicant's own patent has an adjustability which is not infinitely variable, but which is limited by the spacing of the threads interengaging the various parts of the assembly. In certain of the other prior art, it is taught to draw a ball through a tube and thus expand the tube as brake wear compensation is made. The tube itself is characterized by a baked-on lubricant to reduce the frictional contact between the ball and the tube and thus reduce that portion of the adjustment load, thereby leaving only the load dissipated in the expansion process. In manufacture, the addition of the lubricant to the tube necessitates an extra step in manufacturing process. Further, once the ball has been drawn through the tube, it is not possible to reuse that adjustment mechanism in association with a new brake disk stack since the tube has been deformed.

With respect to the ball and tube type of brake adjuster, it has been found that the utilization of only the expansion load of the tube obviates the problem experienced in the standard unit transition between static and dynamic frictional forces as discussed hereinabove. It has further been found that such a brake adjuster operates satisfactorily and with a reasonable degree of predictability and repeatability. However, with such apparatus not being reusable and relying upon an expansion of a metal tube, requiring great force, it has become desirable to provide yet a better type of brake adjuster.

OBJECTS OF THE INVENTION

In light of the foregoing, it is an object of the instant invention to present a brake adjuster having an internal swage wherein there is no force dissipated in expanding a metal tubular member.

Another object of the invention is to present a brake adjuster having an internal swage which is predictable and repeatable in operation with respect to consecutive brake applications.

Still another object of the invention is to present a brake adjuster having an internal swage wherein the force differential between static and dynamic friction between the parts thereof is minimized.

A further object of the invention is to present a brake adjuster having an internal swage which is reusable while being simplistic in design, and easily adapted to utilization with existing brake systems, and relative inexpensive to construct.

SUMMARY OF THE INVENTION

The foregoing objects and other objects of the invention which will become apparent as the detailed description proceeds are achieved by: the improvement in a braking system including a brake housing and a pressure plate, comprising a casing connected to the brake housing; reciprocating means maintained within said casting for reciprocating movement between first and second ends of said casing; a tubular member, having first and second ends, in engagement at said first end thereof with said reciprocating means; a shaft passing through said tubular member, one end of said shaft passing through an opening in said casting and being secured to the pressure plate; and an enlarged portion connected to the other end of said shaft and in reshaping engagement with the inside circumference of said second end of said tubular member, said enlarged portion having a perimeter substantially equal to the inside circumference of said tubular member, said enlarged portion and said tubular member having different cross-sectional geometric configurations.

DESCRIPTION OF DRAWING

For a complete understanding of the objects, techniques, and structure of the invention, reference should be had to the following detailed description and accompanying drawing wherein:

FIGS. 2a and 2b, is a top plan view and side cross-sectional view, respectively, of the swage of the invention.

DETAILED DESCRIPTION OF THE PREFERRED EMBODIMENT

Figure 1:
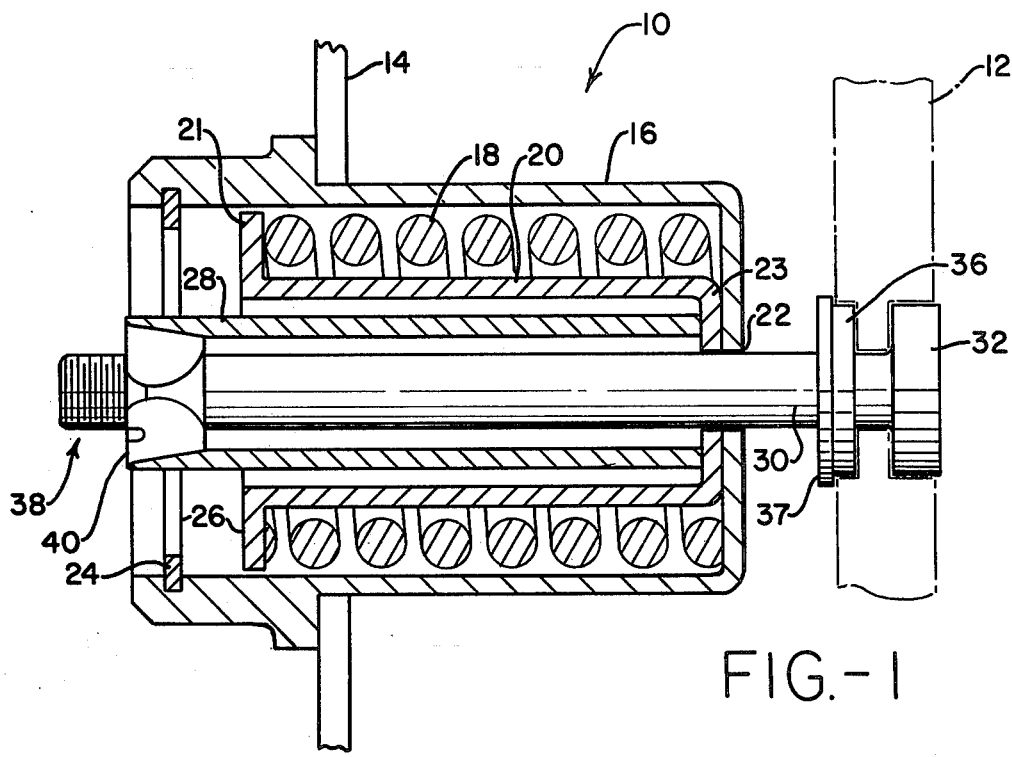
FIG. 1 is a cross-sectional view of the brake adjuster assembly of the invention, showing the same in interengagement between a pressure plate and brake housing.

Referring now to the drawing and more particularly FIG. 1, it can be seen that a brake adjuster assembly according to the teachings of the invention is designated generally by the numeral 10. The assembly 10 is shown as being interconnected between a pressure plate 12 associated with the brake disk stack (not shown) and a brake housing 14. The casing 16, part and parcel of the assembly 10, is fixedly secured to the housing 14. Maintained within the casing 16 is a spring 18 in cooperative engagement with a spring follower 20. The spring follower 20 is characterized by a flange 21 at one end thereof and a shoulder 23 at the other end thereof.

The end of the casing 16 opposite the opening 22 is enclosed by an annular end plate 24. Movement of the spring follower 20 within the casing 16 is under control of pressure applied to the pressure plate 12 and the return force of the spring 18. The distance of such movement is restricted by the end plate 24 at one end and by engagement of the shoulder 23 with the end of the casing 16 at the other. The gap 26, shown in FIG. 1, equals the maximum distance of travel of the spring follower 20 and is defined as the built-in clearance between the disks of the brake disk stack. It is this distance which must be taken-up in the brake adjuster 10 by means of brake pressure applied to the pressure plate 12 before compensation for wear may be made and effective braking force applied to the brake disk stack. It will, of course, be appreciated that as shown in FIG. 1, the brake assembly 10 is in the brake-actuated position. When brake pressure is released, the spring 18 returns the spring follower 20 to a point where the flange 21 abuts the annular plate 24. The brake disks then separate by an aggregate equal to the gap 26.

Figure 3:
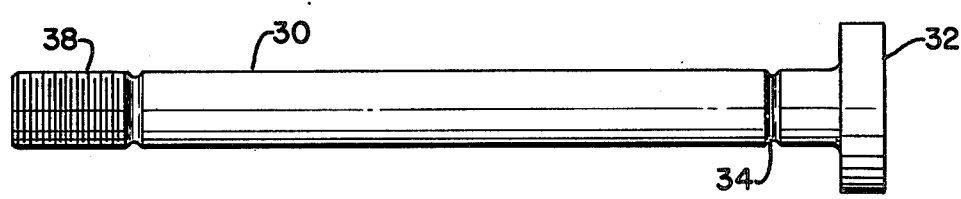
FIG. 3 is a top plan view of the shaft used in interengagement between the swage and pressure plate.

Received within the spring follower 20 is a metal tube 28 which rests upon the inner surface of the shoulder 23 at one end thereof and passes through the opening in the annular plate 24 at the other end. Received within the tube 28 is a shaft 30, shown in more detail in FIG. 3, which is characterized by a head 32 at one end thereof. A short distance from the head 32 and at the same end of the shaft 30, is a groove 34. In implementation, the shaft 30 is passed through an opening in the pressure plate 12, the head 32 making engagement with a mating recess. A washer 36 is then placed over the shaft 30 and into engagement with another recess on the opposite side of the pressure plate 12. A keeper 37 is then snapped into position in mating engagement with the groove 34 formed in the shaft 30. The shaft 30 is thus secured at one end thereof to the pressure plate 12. The opposite end of the shaft 30 is threaded as at 38 to receive a swage 40 thereupon.

Figure 2:
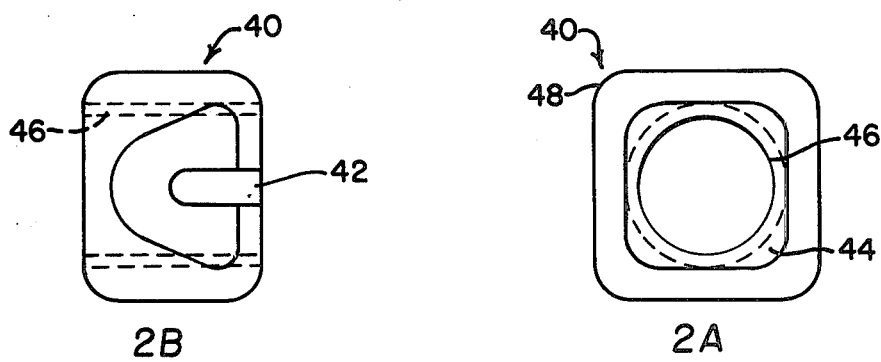
FIG. 2, comprising

With reference now to FIG. 2, it can be seen that the swage 40 is substantially square in nature and is characterized by a slot 42 passing thereacross. The slot 42 is preferably of a depth equivalent to the most advantageous depth to effect a satisfactory self-locking effect. A tapped hole 46 passes centrally through the swage 40 and is threaded to mate with the threads 38 on the end of the shaft 30. Indeed, after the swage 40 is tapped, the slot is slightly crushed inwardly in such a manner as to urge a closing of the slot 42 before it is threaded upon the threads 38. This slight crushing, facilitated by the slot 42, causes the swage 40 to lock upon the threads 38 of the shaft 30 since the slight crushing gives the swage a spring load to cause the same to bite into the threads.

With continued reference to FIG. 2, it can be seen that the edges 48 are rounded such that the swage 40 may be drawn through the tube 28 with little friction during the adjustment process. Further, it is preferred that the tube 28 and swage 40 be constructed of self-lubricating, corrosion-resistant metals, that is, metals which are impregnated with a lubricant during manufacture. In the alternative, the parts may be sprayed with a molydisulfide graphite spray which may be baked onto the parts. In any event, the rounded edges 48 and the lubrication provide for a reduction in friction between the swage 40 and tube 28, by establishing a consistency in the force versus displacement curve of the brake adjuster assembly 10.

While the dimensions of the various elements of the invention may be determined by one skilled in the art, dependent upon the braking system which the adjuster 10 is to be utilized, certain dimensions for the preferred embodiment are presented herein. For example, it has been found that a tube 28 having an outside diameter of 0.50 inches and an inside diameter of 0.402 inches will work satisfactorily with a swage having four sides rounded at 48 in both the horizontal and vertical directions and a perimeter slightly less than the inside circumference of the tube. Such dimensions will allow the swage 40 to be slowly drawn through the tube 28, reshaping the tube 28 from a round cross-section to a substantially square cross-section, congruent with the major cross-section of the swage 40. It will be noted that it is the purpose of the instant invention to reshape and not expand the tube 28 such that the perimeter of the newly shaped tube is substantially equivalent to the circumference of the tube originally. It will be readily apparent that as the brake disk stack wears, the swage 40 will be drawn, on successive brake applications, incrementally through the tube 28 until maximum usage of the disks of the brake disk stack has been achieved.

As mentioned hereinabove, when brake pressure is applied to the pressure plate 12, the first portion of brake pressure takes up the built-in clearance 26. With the shoulder 23 resting upon the end of the casing 16, the next bit of pressure is that required for adjusting the brake and results in the drawing of the swage 40 further into the tube 28. When the adjustment is made, the remaining force is the effective brake force forcing the disks of the brake disk stack into frictional braking engagement with each other. The amount of force required to achieve the adjustment varies, of course, with the size of the swage 40 and tube 28. It has been found, by way of example, that with the major perimeter of the swage 40 only slightly less than the inside circumference of the tube 28, the wall thickness and the difference of circumference between the swage 40 and the tube 28 determines the load necessary for achieving brake adjustment. For example, with a wall thickness of 0.034 inches and the major perimeter of the swage between 0.002 inches less than the inside circumference of the tube, a 550 pound load is necessary to achieve movement between the swage and the tube. For the same tube, with the inside circumference being 0.018 inches greater than the major perimeter of the swage, a load of only 175 pounds is required. By the same token, with the circumference being 0.002 inches greater than the perimeter, and the wall thickness of the tube being 0.060 inches, a 1,200 pound load is necessary. Consequently, design considerations must be given to these criteria when implementing the teachings of the invention disclosed herein.

As mentioned hereinabove, it is a particular attribute of the instant invention that once the swage 40 has been drawn through the tube 28, the assembly may be reused for a new brake disk stack. This may be done by simply rotating the swage and tube 30° with respect to each other such that the rounded edges 48 will now engage the tube 28 at a new area of the flattened sides formed by the swage 40 when it was first used. As also mentioned hereinabove, the instant invention provides benefits over the teachings of the prior art in that there is not a stretching of the metal of the tube 28, but merely a reshaping of the cross-section thereof. The circumference of the tube 28 before the swage 40 passes therethrough is substantially the same as the perimeter of the tube 28 after the reshaping has occurred. The great amount of friction experienced in the prior art, critically requiring lubrication for proper operation, is alleviated since the reshaping technique of the instant invention entails less friction than the stretching or enlarging technique of the prior art.

Thus it can be seen that the objects of the invention have been satisfied by the structure and techniques presented hereinabove. While in accordance with the patent statutes only the best mode and preferred embodiment of the invention has been presented and described in detail, it is to be understood that the invention is not limited thereto or thereby. Consequently, for an appreciation of the true scope and breadth of the invention, reference should be had to the following claims.

What is claimed is:

1. In a braking system including a brake housing and a pressure plate, the improvement, comprising:
   a casing connected to the brake housing;
   reciprocating means maintained within said casing for reciprocating movement between first and second ends of said casing;
   a tubular member, having first and second ends, in engagement at said first end thereof with said reciprocating means;
   a shaft passing through said tubular member, one end of said shaft passing through an opening in said casing and being secured to the pressure plate; and
   an enlarged portion connected to the other end of said shaft and in reshaping engagement with the inside circumference of said second end of said tubular member, said enlarged portion having a perimeter substantially equal to the inside circumference of said tubular member, said enlarged portion and said tubular member having different cross-sectional geometric configurations whereby passage of said enlarged portion through said tubular member changes the cross-sectional configuration of said tubular member without changing the inside circumference thereof.

2. The improvement in a braking system as recited in claim 1 when said reciprocating means comprises a spring follower.

3. The improvement in a braking system as recited in claim 2 wherein said enlarged portion comprises a swage.

4. The improvement in a braking system as recited in claim 3 wherein said swage has a perimeter slightly less than the inside circumference of said tubular member.

5. The improvement in a braking system as recited in claim 4 wherein said swage is square, the edges and corners of said swage being rounded to prevent scoring of said tubular member.

6. The improvement in a braking system as recited in claim 5 wherein said swage is drilled and tapped for being threadily secured to a second end of said shaft, said swage being slotted and crimped to effect a self-locking engagement with said shaft.

7. The improvement in a braking system as recited in claim 5 wherein said swage and tubular member are of self-lubricating, corrosion-resistant metal construction.

8. In a braking system including a brake housing and a pressure plate, the improvement of a brake adjuster, comprising:
   a casing connected to the brake housing and receiving therein a spring follower in reciprocating engagement between two ends thereof;
   a tube received within and in contacting engagement with one end of said spring follower;
   a shaft received within said tube and secured to said pressure plate at a first end thereof; and
   a swage connected to a second end of said shaft and having a perimeter slightly less than the inside circumference of said tube, said swage being adapted to be drawn through said tube, thereby reshaping the cross-sectional geometry of said tube without altering the inside circumference thereof.

9. The improvement in a braking system as recited in claim 8 wherein said swage is of a cross-sectional geometry different from said tube.

10. The improvement in a braking system as recited in claim 9 wherein said swage is characterized by rounded corners and edges.

11. The improvement in a braking system as recited in claim 10 wherein said swage is square.

12. The improvement in a braking system as recited in claim 11 wherein said shaft is threaded at said second end and said swage is drilled, tapped, slotted, and crimped for self-locking threaded engagement with said shaft.

13. The improvement in a braking system as recited in claim 8 wherein said swage is drawn through said tube to adjust for brake wear, said swage reshaping said tube without stretching the same.

14. The improvement in a braking system as recited in claim 13 wherein a load applied to the pressure plate is operative to draw said swage through said tube, the load required for so drawing said swage through said tube being directly related to the wall thickness of said tube and inversely related to the difference between the perimeter of said swage and the inside circumference of said tube.

15. The improvement in a braking system as recited in claim 8 wherein said tube is of circular cross-section and said swage is of square cross-section, the corners and edges of said swage being rounded.

16. The improvement in a braking system as recited in claim 15 wherein said swage and tube are both constructed of self-lubricating, corrosion-resistant metal.

* * * * *